United States Patent Office 3,490,743
Patented Jan. 20, 1970

3,490,743
DISINFECTING PREPARATION IN CAKE FORM AND PROCESS FOR ITS PREPARATION
Adolf Schmitz, Bandelstrasse 23, Essen, Germany, and Christa Schuermann, Hummelshagen 70, Kettwig (Ruhr), Germany
No Drawing. Filed Feb. 28, 1967, Ser. No. 619,157
Claims priority, application Germany, Mar. 26, 1966, G 46,421
Int. Cl. C11d *3/48;* A01n *9/36*
U.S. Cl. 252—106    5 Claims

ABSTRACT OF THE DISCLOSURE

The invention is concerned with a disinfecting preparation in cake form which is particularly suitable for disinfecting human hands, both for hygienic and surgical purposes. The disinfecting preparation essentially consists of cakes which comprise as the microbicidally active substance about 50 to 70% by weight of at least one compound of the general formula $$(C_{12}H_{25}-NHCH_2CH_2CH_2NH-R-COOH)_x(H_3PO_4)_y$$

wherein R=—CH$_2$— or $$-\underset{\underset{CH_3}{|}}{CH}-$$

$x=2$ or 3 and $y=1$ or 2. The cakes also contain about 10 to 30% by weight of an ethanolamide of a fatty acid of 12 to 18 carbon atoms and about 10–30% by weight of a water soluble carboxylic acid having a melting point in excess of 100° C.

A particularly suitable disinfecting cake is obtained if the above-indicated ingredients have a ratio, in the indicated sequence, of about 60:20:20.

The invention also discloses a process of preparing the disinfectant cakes. This process essentially resides in precipitating compounds of the formula $$(C_{12}H_{25}-NHCH_2CH_2CH_2NH-R-COOH)$$

wherein R has the indicated meaning, from their aqueous solutions with phosphoric acid in a mole ratio of about 3:1 to 3:2. The precipitate is then separated from the solution and the phosphoric acid salt thus obtained is mixed with the ethanolamide and the carboxylic acid in the desired ratio, whereupon the mixture is further processed into cakes in a manner well known from soap production.

The inventive disinfecting cakes have superior microbicidal characteristics, excellent skin compatibility and foaming and wash characteristics.

DESCRIPTION OF THE INVENTION

The invention generally relates to disinfectants and is particularly directed to a novel disinfecting preparation in cake form which contains as active microbicidal ingredient a compound of the general formula $$C_{12}H_{25}-NHCH_2CH_2CH_2NH-R-COOH$$

wherein R=—CH$_2$— or $$-\underset{\underset{CH_3}{|}}{CH}-$$

The cake-shaped disinfecting preparation of this invention is particularly suitable for disinfecting human hands both for hygienic and surgical purposes.

It has previously been suggested to compress a mixture of compounds of the general formula $$R-NH-(C_nH_{2n}-NH)_x-R'-COOH$$

or their salts with acids and urea into cakes for wash- and disinfecting preparations.

In this formula R stands for alkyl or aralkyl with 8 to 18 aliphatic carbon atoms, R' is lower, if desired, branched alkyl with up to 4 carbon atoms, $n$ stands for 2 or 3 and $x$ is 0 to 3.

Practical experience, however, has demonstrated that cakes of these prior art preparations have serious drawbacks which have negatively affected their commercial success. As a matter of fact, these known disinfecting preparations in cake form have not been well received by the public and the trade. These disadvantages of the prior art preparations are primarily due to the relatively high urea content in the preparations which amounts to 50% or even more. This high urea content correspondingly reduces the content of wash active substances to such as extent that the cakes lose their soap-like character. Further, the urea has a tendency rapidly to be dissolved from the soap cake with the result that the cakes become pulpy and soggy and thus are difficult and unpleasant to handle. It should also be mentioned that the dissolution of the urea from the cake is accompanied by an unpleasant heat effect which is noticed by the user in the form of a chilling sensation on the hands.

It is a primary object of the present invention to overcome the disadvantages and drawbacks of the prior art disinfecting preparations in cake form of the nature referred to while at the same time providing a disinfecting preparation which has superior disinfecting and microbicidal properties, which retains its soap-like character even after a major portion of the cake has been consumed and which has a pleasant feel to the hands of the user.

Another object is the provision for a novel process for preparing the disinfecting cakes.

Generally, it is an object of this invention to improve on the art of disinfecting preparations in cake form as presently practiced.

Briefly, and in accordance with this invention, a disinfecting preparation in cake form essentially consists of (a) About 50 to 70% by weight of at least one compound of the general formula $$(C_{12}H_{25}-NHCH_2CH_2CH_2NH-R-COOH)_x(H_3PO_4)_y$$

wherein R=—CH$_2$— or $$-\underset{\underset{CH_3}{|}}{CH}-$$

$x=2$ or 3 and $y=1$ or 2;

(b) About 10 to 30% by weight of an ethanolamide of a fatty acid having 12 to 18 carbon atoms and (c) About 10 to 30% by weight of a water soluble carboxylic acid having a melting point in excess of 100° C.

It has been ascertained that particularly effective and advantageous disinfecting cakes of the indicated kind are obtained if the weight ratio of the indicated ingredients in the enumerated sequence of (a), (b) and (c) is about 60:20:20.

Ingredient (a) referred to above, which is thus the active microbicidal substance in the form of a phosphoric acid salt, can be readily prepared, for example according to the teachings as contained in French Patent 1,453,551.

Concerning ingredient (b), to wit, the ethanolamide, it has been established that stearic acid monoethanolamide yields particularly favorable results. However, the ethanolamides of other fatty acids, as for example of palmitic acid or oleic acid can also successfully be used.

In respect to ingredient (c), to wit, the carboxylic acid which has to have a melting point above 100° C. and which has to be water soluble, it has been ascertained that ethylenediaminetetraacetic acid and the oxycarboxylic acids, in particular, citric acid, are exceptionally suitable. The carboxylic acids may be partially neutralized by the addition of an alkalimetal hydroxide or carbonate, e.g. sodium hydroxide. The neutralization may then be carried out to an extent that an aqueous solution of the partially neutralized acid would have a pH value of about between 5–6.

The inventive disinfecting preparation in cake form may be advantageously prepared by precipitating compounds of the general formula

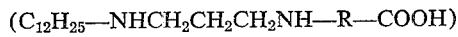
$(C_{12}H_{25}-NHCH_2CH_2CH_2NH-R-COOH)$ wherein R has the above-indicated meaning, from their aqueous solutions with phosphoric acid in a mole ratio of 3:1 to 3:2. The precipitate is then separated from the solution, whereupon the phosphoric acid salts thus obtained are mixed with the ethanolamide and the carboxylic acid in the desired ratio. The mixture is then compressed into cake form in any suitable manner and by any suitable equipment known per se from the preparation of soaps.

In contrast to the prior art disinfecting preparations in cake form which contain considerable amounts of urea, the inventive disinfecting preparations which, as pointed out, are particularly suitable for disinfecting human hands, have an appearance quite similar, if not identical, to that of ordinary soap cakes. In ordinary soap cakes, additives such as, for example, ethanolamide, merely serve as fillers and are added to the soap composition for the purpose of producing a foam of fine bubbles. The additives may also to a certain extent restore the fat content of the skin which has been removed on account of the washing operation. These additives have, however, additional functions in the inventive preparations. For example, the ethanolamide has thus a plastifying influence on the disinfecting mass which is processed at elevated temperatures and imparts the mixture in an extrusion press with an improved sliding or gliding capacity. The carboxylic acid, on the other hand, is bound in salt-like manner by those amino groups of the active substance (a) which are still available for this purpose and in this manner a further stabilization of the microbicidal, wash-active substance is obtained.

Extensive tests have indicated that the inventive disinfecting cakes are superiorly suitable for disinfecting human hands for hygienic and surgical purposes.

The invention will not be described by several examples and tests, it being understood, however, that these examples and tests are given by way of illustration and not by way of limitation and that many changes may be effected without affecting in any way the scope and spirit of the invention in the appended claims.

The following tests were conducted according to the guidelines for the testing of chemical disinfectants as published by the Deutschen Gesellschaft fuer Hygiene und Mikrobiologie.

TEST 1

Disinfection of artificially infected hand (hand disinfection for hygienic purposes)

The hands of ten test persons were infected or contaminated with coli bacteria. The coil bacteria-containing medium consisted of a culture of E. coli, grown for 16 hours in an ordinary nutrient broth or medium. The germ number of the culture was about $10^7$/ml. One drop of the broth was distributed by rubbing over the fingertips of one hand. The ten persons thereupon washed their hands for one minute with an inventive disinfecting cake (I) which had the following composition:

Percent by weight
Tri(dodecyl-aminopropylglycine) phosphate _____ 60
Stearic acid monoethanolamide _____ 20
Citric acid _____ 20

The hands were then rinsed with water for a short period of time. Immediately thereafter and in order to determine the presence of surviving germs, the fingertips of the infected hands were kneaded or rubbed in 10 ml. of an ordinary nutrient broth. The broth was contained in a Petri dish and the kneading or frictional rubbing movement of the fingertips against each other was effected for one minute near the bottom of the dish.

With a view to eliminating any possible bacteriostatic after effect, the broth contained 0.1% of a wash-active sarkoside of the type available on the market under the name Medialan R KA konz.

0.1 ml. of this broth was then removed by a pipette and thus transferred onto the surface of a pre-dried endo plate. The liquid was uniformly distributed on the plate. The inoculated broths or culture media were incubated at a temperature of 37° C. and the colonies which had developed in this manner were counted after an incubation period of 24 hours. The test results were arranged in a predetermined pattern. Dependent on the number of germs emanating from the fingertips, the pattern was divided into hands with 0–10 germs, 11–50 germs, 51–100 germs, and hands with more than 100 germs.

For control purposes, the same procedure was effected with an ordinary piece of laundry soap (II).

TEST RESULTS

| Wash medium | Number of hands with (germs) | | | |
|---|---|---|---|---|
| | 0–10 | 11–50 | 51–100 | >100 |
| I | 15 | 2 | 1 | 2 |
| II | 0 | 0 | 4 | 16 |

Pursuant to the guidelines referred to above, a preparation is considered suitable for the disinfection of hands for hygienic purposes, if at least half of the hands treated with the preparation do not introduce more than 0–10 coli germs into the nutrient medium. The above table indicates that the inventive disinfecting cakes have a much more pronounced success than required by the guidelines. Thus, 75% of the hands do not yield more than 0–10 germs.

TEST 2

Hand disinfection for surgical purposes 10 persons washed their untreated hands for 4 minutes with the disinfectant in cake form (I) of the kind described in Test 1.

The hands were rinsed thereafter under running tap water. In the same manner as described in Test 1, the fingertips of both hands of each person were rubbed or kneaded in 10 ml. of the nutrient broth or medium which contained Medialan. Counting plates were prepared with 0.1 ml. of the nutrient medium and the number of the grown colonies was determined after incubation for 2 days at 37° C. Comparison tests were carried out with the following products:

(a) Laundry soap (II);
(b) Ordinary soap containing 2% by weight of hexachlorophene (III);
(c) A prior art hand disinfectant available on the market and having the following composition: dichlorobenzyl alcohol, isopropanol, glycerine and glycol derivative and containing a foaming agent capable of restoring removed fat (IV). This prior art disinfectant was used according to the directions contained on the product.

The following tabulation lists the germ numbers which were ascertained in the various tests. The germ numbers are calculated on 10 ml. of the nutrient medium in which the hands were rubbed. Average values were calculated from the germ numbers ascertained, which average values are listed at the end of the table. The persons subjected to the tests are not the same in the individual rows of the table.

| Test person No. | Test hand | Without treatment | Number of transferred germs per hand after treatment with— | | | |
|---|---|---|---|---|---|---|
| | | | I | II | III | IV |
| 1 | Left | 900,000 | 100 | 310,000 | 670,000 | 3,500 |
| | Right | 1,400,000 | 0 | 350,000 | 730,000 | 25,000 |
| 2 | Left | 750,000 | 1,200 | 920,000 | 380,000 | 2,500 |
| | Right | 100,000 | 1,200 | 870,000 | 380,000 | 3,500 |
| 3 | Left | 35,000 | 31,000 | 250,000 | 160,000 | 4,000 |
| | Right | 59,000 | 1,600 | 290,000 | 220,000 | 7,000 |
| 4 | Left | 12,000 | 0 | 110,000 | 160,000 | 8,000 |
| | Right | 46,000 | 0 | 110,000 | 350,000 | 14,500 |
| 5 | Left | 400,000 | 3,400 | 270,000 | 5 0,000 | 600 |
| | Right | 900,000 | 100 | 230,000 | 260,000 | 2,750 |
| 6 | Left | 600,000 | 0 | 120,000 | 260,000 | 75,000 |
| | Right | 500,000 | 1,000 | 90,000 | 25,000 | 150,000 |
| 7 | Left | 150,000 | 2,100 | 15,100 | 130,000 | 1,000 |
| | Right | 11,100 | 4,400 | 5,700 | 96,000 | 750 |
| 8 | Left | 100,000 | 3,700 | 540,000 | 115,000 | 150 |
| | Right | 25,000 | 0 | 800,000 | 110,000 | 3,000 |
| 9 | Left | 300,000 | 300 | 200,000 | 38,000 | 2,500 |
| | Right | 150,000 | 30,400 | 600,000 | 45,000 | 2,250 |
| 10 | Left | 62,000 | 20,800 | 85,000 | 510,000 | 150 |
| | Right | 17,000 | 0 | 370,000 | 850,000 | 150 |
| Total average value | | 328,355 | 5,065 | 326,790 | 302,950 | 15,315 |

The test conclusively demonstrates the superior characteristics of the inventive disinfecting cake (I).

Another beneficial characteristic of the inventive hand disinfecting preparation in cake form is its excellent skin compatibility. Moreover, the inventive disinfecting cakes have excellent foaming and wash characteristics.

It will be appreciated by those skilled in this art that the inventive disinfecting cakes, of course, may be enriched with additives such as, for example, scenting agents, dyestuffs or pigments, and other additives commonly used for products of this nature.

EXAMPLE I 25 kg. of dodecyl-1,3-aminopropylamine are stirred with 50 l. of water. While continuing the stirring, the mixture is admixed with a solution of 12.8 kg. of sodium chloroacetate dissolved in 35 l. of water. The reaction mixture thus obtained is then heated at a temperature of 90 to 95° C. for about 3 hours while the stirring is continued. In this manner, a solution of a dodecylaminopropyl glycine is obtained. This solution is diluted with 180 l. of water and is admixed with 50 kg. of phosphoric of 10% concentration. The addition of the phosphoric acid causes precipitation of tri(dodecylaminopropyl glycine) phosphate in finely divided form. The precipitated phosphate is removed by filtration, taken up in 200 l. of water and again subjected to filtration. The water containing filter cake is dried in vacuum. In this manner about 30 kg. of an anhydrous product is obtained. These 30 kg. of the phosphoric acid salt are mixed in a kneading vessel, which is heated to 70 to 80° C., with 10 kg. of stearic acid monoethanolamide and 10 kg. of citric acid. The citric acid had previously been dissolved in 5 l. of water. The mass obtained in the kneading vessel is heated until no more water separates therefrom.

The mass thus obtained is then ground and fed to an extrusion press whose extrusion head is heated to about 60° C. The extruded product is subsequently compressed into cakes.

EXAMPLE II

The Example I is repeated. However, the sodium chloroacetate is replaced by 14 kg. of sodium-α-chloropropionate. Due to this replacement, the α-alanine is formed instead of the glycine which is obtained in Example I. The precipitation of the product is performed in the same manner as in Example I with phosphoric acid. The precipitate is washed, dried and mixed with stearic acid monoethanolamide and citric acid. The pressing into cakes is performed as described in Example I.

EXAMPLE III

The procedure of Example I is repeated. However, the stearic acid monoethanolamide is replaced by the same amount of stearic acid diethanolamide and the citric acid is replaced by the same amount of tartaric acid.

EXAMPLE IV 300 kg. of an aqueous solution of a dodecyl-1,3-aminopropylglycine of 10% concentration and prepared according to the procedure described in Example I were mixed with 65 kg. of phosphoric acid of 10% concentration. In this manner, a phosphoric acid salt was precipitated which corresponds to the formula

$$(C_{12}H_{25}.NHCH_2CH_2CH_2CH_2NH.CH_2COOH)_3.(H_3PO_4)_2$$

The precipitate is washed and dried and mixed in the same manner as described in Example I with 7.5 kg. of oleic acid monoethanolamide and 12.5 kg. of succinic acid. The mixture is ground and is passed through an extrusion press and further processed into cakes.

EXAMPLE V 315 kg. of a 10% solution of dodecyl-1,3-aminopropyl-α-alanine are mixed with 250 kg. of phosphoric acid of 10% concentration. The mixing is effected under strong stirring. A dense precipitate is obtained which is removed by suction after some period of standing. The precipitate is then taken up in water and again removed by suction. The phosphoric acid salt obtained in this manner corresponds to the formula

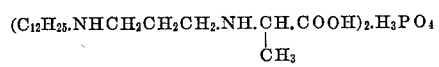

$$(C_{12}H_{25}.NHCH_2CH_2CH_2.NH.CH.COOH)_2.H_3PO_4$$
$$\qquad\qquad\qquad\qquad\qquad\qquad\quad |$$
$$\qquad\qquad\qquad\qquad\qquad\qquad\ CH_3$$

After drying, the precipitate is mixed with 7.5 kg. of coconut fatty acid monoethanolamide and 7.5 kg. of malic acid. The further process into cake form is effected as described in Example I.

EXAMPLE VI

The following ingredients were mixed in the kneader:
30 kg. of the anhydrous tri(dodecylaminopropylglycine)-phosphate obtained according to Example I, 8.5 kg. of the monoethanolamide of stearic acid, 1.5 kg. of the diethanolamide of lauric acid and 10 kg. of ethylenediaminetetraacetic acid, 12.5 l. of 5 N sodium hydroxide solution were added to the mixture. The addition of the solution resulted in a pH-value of 5.5. The kneading of the mixture was continued for about three hours at 100° C. as the result of which the water contained in the mixture evaporized.

The mass thus obtained is first milled and then extruded at 70° C. and finally compressed into cakes. The disinfecting cakes thus obtained have a pleasing exterior shape and are superiorly suitable both for hygienic and surgical disinfection of human hands.

While specific embodiments of the invention have been shown and described in detail to illustrate the application of the inventive principles, it will be understood that the invention may be embodied otherwise without departing from such principles.

What is claimed is:

1. A disinfecting preparation in cake form essentially consisting of a compressed mixture of
   (a) about 50–70% by weight of a microbicidally active substance being at least one compound of the general formula $(C_{12}H_{25}-NHCH_2CH_2CH_2NH-R-COOH)_x(H_3PO_4)_y$ wherein
   $R = -CH_2-$ or
   $$-\underset{\underset{CH_3}{|}}{CH}-$$
   $x = 2$ or $3$ and
   $y = 1$ or $2$;
   (b) about 10 to 30% by weight of an ethanolamide of a fatty acid with 12 to 18 carbon atoms; and
   (c) about 10 to 30% by weight of ethylenediaminetetraacetic acid, tartaric acid, succinic acid, malic acid or citric acid.

2. A disinfecting preparation as claimed in claim 1, wherein the ratio of the ingredients (a), (b) and (c) is about 60:20:20.

3. A disinfecting preparation as claimed in claim 1, wherein said ingredient (b) is stearic acid monoethanolamide, palmitic acid monoethanolamide, oleic acid monoethanolamide, stearic acid diethanolamide or coconut fatty acid monoethanolamide.

4. A process of preparing a disinfecting preparation in cake form which comprises precipitating at least one compound of the formula $(C_{12}H_{25}-NHCH_2CH_2CH_2NH-R-COOH)$ wherein $R = CH_2$ or
$$-\underset{\underset{CH_3}{|}}{CH}-$$
from an aqueous solution of the compound with phosphoric acid in a mole ratio of about 3:1 to 3:2, separating the precipitate from the solution and mixing the phosphoric acid salt thus obtained with an ethanolamide of a fatty acid having between 12–18 carbon atoms and a water soluble carboxylic acid of a melting point of above 100° C. being ethylenediaminetetraacetic acid, tartaric acid, succinic acid, malic acid or citric acid, and compressing the resulting mixture into cake form, said cake containing 50–70% by weight of said phosphoric acid salt, 10–30% by weight of said fatty acid ethanolamide, and 10–30% by weight of said carboxylic acid.

5. A process as claimed in claim 4, wherein said phosphoric acid salt, said ethanolamide and said carboxylic acid are mixed in a ratio of about 60:20:20.

References Cited

UNITED STATES PATENTS 3,039,917   5/1962   Schmitz et al. ———— 167—22

FOREIGN PATENTS 827,359   2/1960   Great Britain.
848,654   9/1960   Great Britain.

RICHARD D. LOVERING, Primary Examiner

P. E. WILLIS, Assistant Examiner

U.S. Cl. X.R.

252—107; 260—501.11, 534; 424—211